(12) United States Patent
Flynn

(10) Patent No.: US 11,681,727 B2
(45) Date of Patent: Jun. 20, 2023

(54) METHOD AND SYSTEM OF MATCHING DATA IN USING MULTIPLE DATA POINTS

(71) Applicant: MASTERCARD INTERNATIONAL INCORPORATED, Purchase, NY (US)

(72) Inventor: Chapin Flynn, Wayne, PA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 688 days.

(21) Appl. No.: 16/567,588

(22) Filed: Sep. 11, 2019

(65) Prior Publication Data

US 2020/0081904 A1    Mar. 12, 2020

Related U.S. Application Data

(60) Provisional application No. 62/729,740, filed on Sep. 11, 2018.

(51) Int. Cl.
*G06F 16/28* (2019.01)
*G06F 18/10* (2023.01)
(Continued)

(52) U.S. Cl.
CPC .......... *G06F 16/285* (2019.01); *G06F 18/10* (2023.01); *G06F 18/22* (2023.01); *G06Q 10/063* (2013.01)

(58) Field of Classification Search
CPC ...... G06F 16/285; G06F 16/284; G06F 18/10; G06F 18/22; G06F 16/28; G06F 18/15;
(Continued)

(56) References Cited

U.S. PATENT DOCUMENTS

| 5,659,731 A * | 8/1997 | Gustafson ......... G06F 16/24578 |
| 2004/0220918 A1 | 11/2004 | Scriffignano et al. |

(Continued)

OTHER PUBLICATIONS

Notification of Transmittal of the International Search Report (Forms PCT/ISA/990 and PCT/ISA/210) and the Written Opinion of the International Searching Authority (Form PCT/ISA/237) dated Dec. 23, 2019, by the Israel Patent Office in corresponding International Application No. PCT/US2019/050605. (8 pages).

*Primary Examiner* — Alford W Kindred
*Assistant Examiner* — Cecile H Vo
(74) *Attorney, Agent, or Firm* — Panitch Schwarze Belisario & Nadel LLP

(57) ABSTRACT

A method for matching supplied organizational data with trade directory information includes: receiving a data file including a plurality of organizational entries, each entry including an entity name and a geographic location; normalizing the entity name in each of the organizational entries; identifying a plurality of matching entries for each organizational entries, each matching entry including a matching name and location, and where each matching entry is identified based on a first correspondence between the matching name and the entity name and a second correspondence between the matching location and the geographic location; determining a confidence level for each of the organizational entries based on the correspondence between the first correspondence and the second correspondence for at least one of the identified matching entries; and transmitting the plurality of matching entries and determined confidence level for each of the plurality of organizational entries.

18 Claims, 5 Drawing Sheets

(51) Int. Cl.
*G06F 18/22* (2023.01)
*G06K 9/62* (2022.01)
*G06Q 10/063* (2023.01)

(58) Field of Classification Search
CPC ... G06K 9/6215; G06K 9/6298; G06Q 10/063
See application file for complete search history.

(56) References Cited

U.S. PATENT DOCUMENTS

| | | | |
|---|---|---|---|
| 2008/0319990 A1* | 12/2008 | Taranenko | G06F 16/29 707/999.005 |
| 2014/0258032 A1* | 9/2014 | Psota | G06Q 30/0609 705/26.35 |
| 2019/0171647 A1* | 6/2019 | Gaddipati | H04L 65/403 |

* cited by examiner

METHOD AND SYSTEM OF MATCHING DATA IN USING MULTIPLE DATA POINTS

FIELD

The present disclosure relates to the matching of data in a trade directory, specifically the identification of a business in a trade directory identified through matching data provided in a data file.

BACKGROUND

Businesses and other entities are often interested in data regarding other entities, which may be buyers, suppliers, competitors, etc. Typically, businesses have to go through difficult processes to identify the other entity and manually locate the other entity with various services to collect more information regarding the other entity. These services often scrape various public and private databases, attempt to normalize the data and resolve conflicts, which is often done by humans, who might guess or bring to bear additional responses. This process can be even more complicated as the business may not be aware of the other entity's registered name, geographic location, or other information that is typically required to look up a business.

Thus there is a need for a technological system to create a high confidence linkage between external, third party data and an authoritative, cleansed, source of business information.

SUMMARY

The present disclosure provides a description of systems and methods for matching supplied organizational data with trade directory information which can be very large and authoritative, e.g., a compiled database of more than 215M business entities in 170 countries (and growing). A computing system can supply a data file that contains a plurality of entries for organizations that include names and geographic locations. A processing server normalizes the organization names, and geographic locations, if applicable, and identifies potential matches in a trade directory. Each entry is provided with a confidence score based on the strength of the potential matches, and then returned to the computing system. In some cases, the matched names may be revealed in accordance with the confidence level of the match, and confirmations sought from the computing system to continually increase the capabilities of the processing server and the matching.

A method for matching supplied organizational data with trade directory information includes: receiving, by a receiver of a processing server, a data file including a plurality of organizational entries from a computing system, each organizational entry including at least an entity name and a geographic location; normalizing, by a processor of the processing server, the entity name included in each of the plurality of organizational entries; identifying, by the processor of the processing server, a plurality of matching entries for each of the plurality of organizational entries, wherein each matching entry includes at least a matching name and a matching location, and where each matching entry is identified based on a first correspondence between the matching name and the respective normalized entity name and a second correspondence between the matching location and the respective geographic location; determining, by the processor of the processing server, a confidence level for each of the plurality of organizational entries, where the confidence level is based on the correspondence between the first correspondence and the second correspondence for at least one of the plurality of matching entries identified for the respective organizational entry; and transmitting, by a transmitter of the processing server, the plurality of matching entries and determined confidence level for each of the plurality of organizational entries to the computing system.

A system for matching supplied organizational data with trade directory information includes: a computing system; and a processing server, the processing including a receiver receiving a data file including a plurality of organizational entries from a computing system, each organizational entry including at least an entity name and a geographic location, a processor normalizing the entity name included in each of the plurality of organizational entries, identifying a plurality of matching entries for each of the plurality of organizational entries, wherein each matching entry includes at least a matching name and a matching location, and where each matching entry is identified based on a first correspondence between the matching name and the respective normalized entity name and a second correspondence between the matching location and the respective geographic location, and determining a confidence level for each of the plurality of organizational entries, where the confidence level is based on the correspondence between the first correspondence and the second correspondence for at least one of the plurality of matching entries identified for the respective organizational entry, and a transmitter transmitting the plurality of matching entries and determined confidence level for each of the plurality of organizational entries to the computing system.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Figure 1:
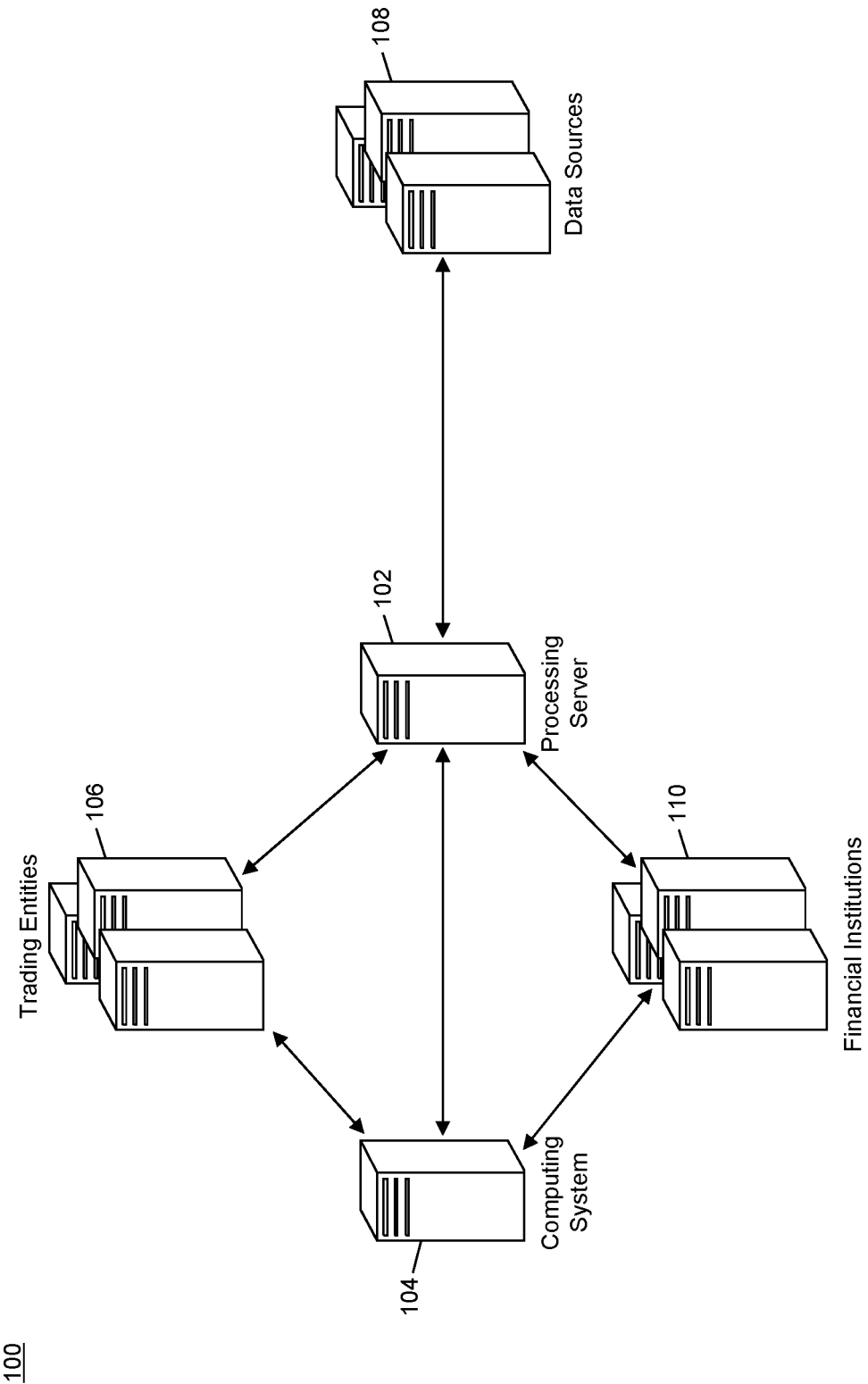
FIG. 1 is a block diagram illustrating a high level architecture of a system for matching supplied organizational data in accordance with exemplary embodiments.

FIG. 1 illustrates a system 100 for the matching of supplied organizational data with entity information located in a trade directory for assistance in future transactions, supply chain management, and other functions.

The system 100 may include a processing server 102. The processing server 102, discussed in more detail below, may be configured to match supplied organizational data with information from a trade directory to identify the entities with which a requesting entity may be doing business or interested in doing business with. In the system 100, a computing system 104 may supply a data file to the processing server 102 using any suitable communication network and method, such as via an application programming interface (API) provided by the processing server 102. The computing system 104 may be any type of system that is specially configured to perform the functions discussed herein.

The data file supplied to the processing server 102 from the computing system 104 may be any type of data file suitable for provided a plurality of organizational entries to the processing server 102, such as a comma separated value file. Each of the organizational entries may include at least an entity name and a geographic location. The entity name and geographic location may be provided in any representation known and/or used by the computing system 104. For example, the computing system 104 may use common names, informal names, doing-business-as names, etc., and may use a street address, zip code, city and state, approximate address, etc. for the geographic location of an entity. The computing system 104 may include the entity name and geographic location for each of a plurality of trading entities 106. Trading entities 106 may be any entities with which the entity associated with the computing system 104, the requesting entity, may do business with, be interested in doing business with, or otherwise interested in or associated with. The processing server 102 may receive the data file of organizational entries and may attempt to match each entry with entities in a registered trade directory.

The trade directory may be stored locally in or be otherwise accessible by the processing server 102. The trade directory may include a plurality of data entries, where each entry is associated with an organizational entity and includes at least a name and geographic location. The name may be a formal, registered business name. The geographic location may be stored in any representation as desired by the processing server 102, such as a registered street address or a latitude and longitude representation of the registered street address, company headquarters, or other representative geographic location. The trade directory may also include any additional information that may be suitable in matching an organizational entry with the entry in the trade directory, such as additional names used by the organizational entity, doing-business-as names, common misspelling of names used for matching, historic names, past names, additional geographic locations, associated business areas, etc. The trade directory may also include additional information that may be desired by computing systems 104, such as websites, organizational data, board information, banking information, industry information, etc.

The trade directory may be built by the processing server 102 using information collected from the trading entities 106 directly as well as additional data sources 108. For instance, the processing server 102 may request each entity that requests information therefrom to first register their organizational entity with the processing server 102 for inclusion in the trade directory, or provided other incentives to register such as when asking to uploading a file for matching or when requesting premium content to name a few. For instance, prior to submitting the data file to the processing server 102, the computing system 104 may register its organizational entity with the processing server 102. The computing server 104 and financial institutions 110 typically communicate through the processing server 102, though communications can be direct between the computing server 104 and financial institutions. Registration of an organizational entity may include providing a formal, registered entity name for the organizational entity as well as the registered street address for the entity, as well as any additional information that may be included in the data entry for the entity in the trade directory, such as the additional names and locations associated with the entity. Of course the system may be accessed by stewards to manually address exceptions, but the system is otherwise automated. For instance, if customer 1 submits a file and ten items do not match, the data stewards may review those non-matches and determine if they can manually create a linkage to the trade directory record. If so, the linkage is made for that customer and the formerly unmatched business name and address get added as alias fields in the trade directory so that, when a future customer submits a similar name/address string, the match algorithm will automatically connect the submitted record to the trade directory record with no manual intervention.

The processing server 102 may also collect information from the additional data sources 108 for use in building and maintaining the trade directory. The data sources 108 may include credit bureaus, chambers of commerce, business registries, industry publications and registries, mapping services, etc. The processing server 102 may receive data from the data sources 108 on a push or pull basis, and may build and supplement the trade directory accordingly. For instance, the data sources 108 may provide additional names for a registered entity as new names are used in the course of doing business, where the processing server 102 may store the additional names in the corresponding data entry in the trade directory. In another example, a first entity may acquire a second entity, where a data source 108 may provide such information to the processing server 102, which may merge the two data entries in the trade directory, such that information supplied for the second entity results in a match with the first entity due to the acquisition.

Once the processing server 102 has received the data file from the computing system 104, the processing server 102 may normalize the data included therein. Normalization of entity names may include the removal or adjustment of punctuation (e.g., changing "&" to "and," removing commas, etc.), the removal or adjustment of organizational types (e.g., "LLC," "Corp," "Inc.," "Incorporated," etc.), the removal or reduction of concurrent spaces, etc. Normalization of geographic locations may include the identification of latitude and longitude representations for an address, identification of a zip code or postal code for an address, etc.

After the organizational entries have been normalized, the processing server 102 may identify a plurality of matching entries for each of the organizational entries included therein. In some cases, the processing server 102 may identify a predetermined number of matching entries, such as identifying the ten best matching entries in the trade directory. Matching entries may be identified based on two correspondences: a first correspondence between the entity name and one or more of the names in the matching entry, and a second correspondence between the geographic location in the organizational entry and one of the geographic locations in the matching entry. In some cases, matching of the entity name to one or more names in the matching entry may utilize a Jaro Winkler distance, which may be used to identify a strength of the match and accommodate for misspellings, incorrect spellings, etc. The normalization and customization of the algorithm may be used to create the strength of the match.

The processing server 102 may order the matches based on the strength of the match to the organizational entry, where the strength of the match is based on the strength of the two correspondences used to identify the match. For instance, an exact match between the entity name and a formal name in a matching entry as well as the geographic locations being an exact match may result in that match being stronger than any of the other matching entries identified for an organizational entry. Other criteria used to order the matches by strength may be the Jaro Winkler distance for name matches and a geographic distance between the geographic locations in the second correspondence.

After the matches have been identified for an organizational entry, the processing server 102 may determine a confidence score for the match. The confidence score may be a representation of the strength of the matches identified for the organizational entry. In some cases, the confidence score may be given an integer value (e.g., on a scale of 1 to 100 in terms of strength). In other cases, the confidence score may be provide a descriptor (e.g., high, medium, or low confidence). In some instances, the confidence score may be represented by terms of "high confidence," a "likely match," or "no match" for low correspondences in any identified matching entry, which may indicate that the trading entity 106 associated with the organizational entry is not registered and data for the entity has not been collected in the trade directory.

After the confidence scores have been identified, the processing server 102 may return the matching results to the computing system 104 using any suitable communication network and method. In some instances, the matching results may be included in a data file transmitted to the computing system 104. In other instances, the matching results may be made available via a web page, application program, or other method that may be accessible by the computing system 104, where the matching results may be transmitted to the computing system 104 via the transmission of a message regarding access to the matching results (e.g., a uniform resource locator pointing to the web page where the results can be viewed).

The computing system 104 may then view the matching results and provide the data to a user thereof. In some cases, the processing server 102 may seek confirmation of the results from the computing system 104. In such cases, the user of the computing system 104 may view the matches for each of the organizational entries and provide a confirmation of the best match or may select from the matches. For organizational entries for which no match is found or the confidence score is below a predetermined threshold, the computing system 104 may be requested to provide registration information for the corresponding trading entity 106. In some cases, the presentation of matches may be based on the determined confidence score for the organizational entry. For instance, for organizational entries with a high confidence score, the computing system 104 may be presented with the one best match identified for the organizational entry for confirmation, whereas, for organizational entries with a medium confidence score, the computing system 104 may be presented with the four most likely matches for selection by the computing system 104.

Information regarding the selections and confirmations may be returned to the processing server 102 using any suitable communication network and method. The processing server 102 may use the selections and confirmations to strengthen the trade directory for future matches. For instance, if the entity names for confirmed matches are not an exact match to the organizational name provided in the matching entry, the entity name may be included in the matching entry in the trade directory as an additional name. For instance, a misspelling that was included in the organizational entry may be included in the trade directory to strengthen future matches. Similarly, a geographic location that is not included in the matching entry or may have a different name or street number may be included in the matching entry for use in future matches.

In some embodiments, the processing server 102 may store the organizational entries supplied by the computing system 104 for use in future functions. For instance, the processing server 102 may be utilized in future business dealings of the computing system 104 and the entity associated therewith, where the trading entities 106 associated with the organizational entries may be used in future payment transactions, purchases, deliveries, etc. In such cases, the processing server 102 may be able to assist the computing system 104 and trading entities 106 in the identification of addresses, banking information for financial institutions 110 that may be associated with the entities, distribution and updating of purchases orders and invoices, communication to new potential customers or suppliers, etc. In such cases, the processing server 102 may maintain databases to store such information and to assist in the business-to-business interactions between the entity associated with the computing system 104 and the various financial institutions 110 and trading entities 106.

The methods and systems discussed herein enable an entity to submit, via their computing system 104, a list of trading entities 106 they are involved with or want to be involved with to the processing server 102 to have them matched and obtain correct information regarding the business name and registered geographic location of the business, which can be used to provide a variety of additional services to the computing system 104 to take advantage of either directly or via platforms provided by the processing server 102. The use of a trade directory of registered organizations enables the processing server 102 to quickly identify matches, where confidence scores are used to provide the computing system 104 with information regarding the strength of the match and the opportunity to confirm matches, if applicable, which can further strengthen the trade directory and capabilities of the processing server 102. The result is faster and stronger matching, even in instances where a computing system 104 may request information on thousands of trading entities 106, which can be done exceedingly fast by the processing server 102 using the functions discussed herein.

Processing Server

Figure 2:
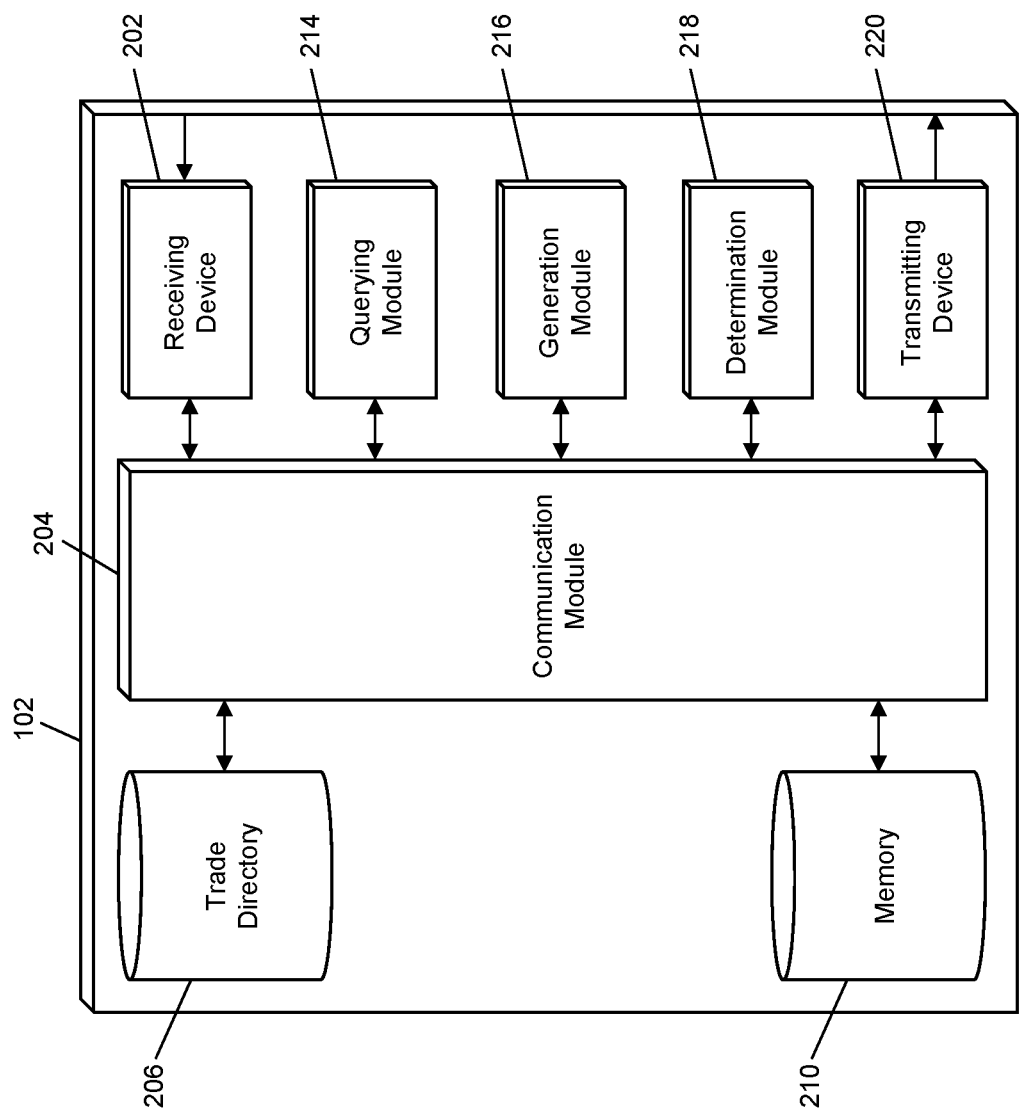
FIG. 2 is a block diagram illustrating a high level architecture of the processing server of the system of FIG. 1 in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102. The computing system 104, trading entities 106, data sources 108, and financial institutions 110 in the system 100 and illustrated in FIG. 1 may be implemented as the processing server 102 illustrated in FIG. 2 and discussed herein.

The processing server 102 may include a receiving device 202. The receiving device 202 may be configured to receive data over one or more networks via one or more network protocols. In some instances, the receiving device 202 may be configured to receive data from computing systems 104, trading entities 106, data sources 108, financial institutions 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing systems 104 that may be superimposed or otherwise encoded with data files that include a plurality of organizational entries, confirmation information or selections for matches, and registration information for an associated entity. The receiving device 202 may also be configured to receive data signals electronically transmitted by trading entities 106, computing systems 104, data sources 108, and financial institutions 110 that are superimposed or otherwise encoded with registration data for organizational entities, additional information, and data used in assisting with business dealings between computing systems 104 and trading entities 106.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, determination module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may also include a trade directory 206. The trade directory 206 may be configured to store data using suitable data formatting methods and schema and may be any suitable type of memory, such as read-only memory, random access memory, etc. In some embodiments, the trade directory 206 may be comprised of or may otherwise include a relational database that utilizes structured query language for the storage, identification, modifying, updating, accessing, etc. of structured data sets stored therein. The trade directory 206 may be configured to store a plurality of data entries, where each data entry is associated with a trading entity 206. A data entry may include at least a formal entity name for the associated trading entity 206 and a registered geographic location, which may be stored in any suitable type of representation. Each data entry may further include additional information associated with the related trading entity 106, such as additional names, alternative names, past names, associated entities, additional addresses, industry information, business information, invoice or purchase order data, shipping address, banking information, etc.

The processing server 102 may also include a memory 210. The memory 210 may be configured to store data for use by the processing server 102 in performing the functions discussed herein, such as public and private keys, symmetric keys, etc. The memory 210 may be configured to store data using suitable data formatting methods and schema and may be any suitable type of memory, such as read-only memory, random access memory, etc. The memory 210 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 210 may be comprised of or may otherwise include a relational database that utilizes structured query language for the storage, identification, modifying, updating, accessing, etc. of structured data sets stored therein. The memory 210 may be configured to store, for example, matching algorithms, conversion data for latitude and longitude coordinates, distance measuring algorithms, trading information for computing systems 104 and trading entities 106, bank routing information for financial institutions 110, etc.

The processing server 102 may include a querying module 214. The querying module 214 may be configured to execute queries on databases to identify information. The querying module 214 may receive one or more data values or query strings, and may execute a query string based thereon on an indicated database, such as the trade directory 206 of the processing server 102 to identify information stored therein. The querying module 214 may then output the identified information to an appropriate engine or module of the processing server 102 as necessary. The querying module 214 may, for example, execute a query on the trade directory 206 to identify matching entries that match an organizational entry based on the correspondences between the names and locations.

The processing server 102 may also include a generation module 216. The generation module 216 may be configured to generate data for use by the processing server 102 in performing the functions discussed herein. The generation module 216 may receive instructions as input, may generate data based on the instructions, and may output the generated data to one or more modules of the processing server 102. For example, the generation module 216 may be configured to generate Jaro Winkler distances for use in correspondences, generate new data entries for storage in the trade directory 206, generate data files that include match information and confidence scores, etc.

The processing server 102 may also include a determination module 218. The determination module 218 may be configured to perform determinations for the processing server 102 as part of the functions discussed herein. The determination module 218 may receive instructions as input, which may also include data to be used in performing a determination, may perform a determination as requested, and may output a result of the determination to another module or engine of the processing server 102. The determination module 218 may, for example, be configured to determine matches for organizational entries based on determined correspondences between names and locations, determine confidence scores based on the strength of matches, etc.

The processing server 102 may also include a transmitting device 220. The transmitting device 220 may be configured to transmit data over one or more networks via one or more network protocols. In some instances, the transmitting device 220 may be configured to transmit data to computing systems 104, trading entities 106, data sources 108, financial institutions 110, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to computing systems 104, trading entities 106, data sources 108, and financial institutions 110 that may be superimposed or otherwise encoded with requests for names, addresses, and additional information for trading entities 106. The transmitting device 220 may also be configured to electronically transmit data signals to computing systems 104, which may be superimposed or otherwise encoded with matching data including matching entries for a plurality or organizational entries, which may be ordered based on strength and accompanied by confidence levels, which may be presented in accordance with the respective confidence level.

Process for Matching Supplied Organizational Data

Figure 3:
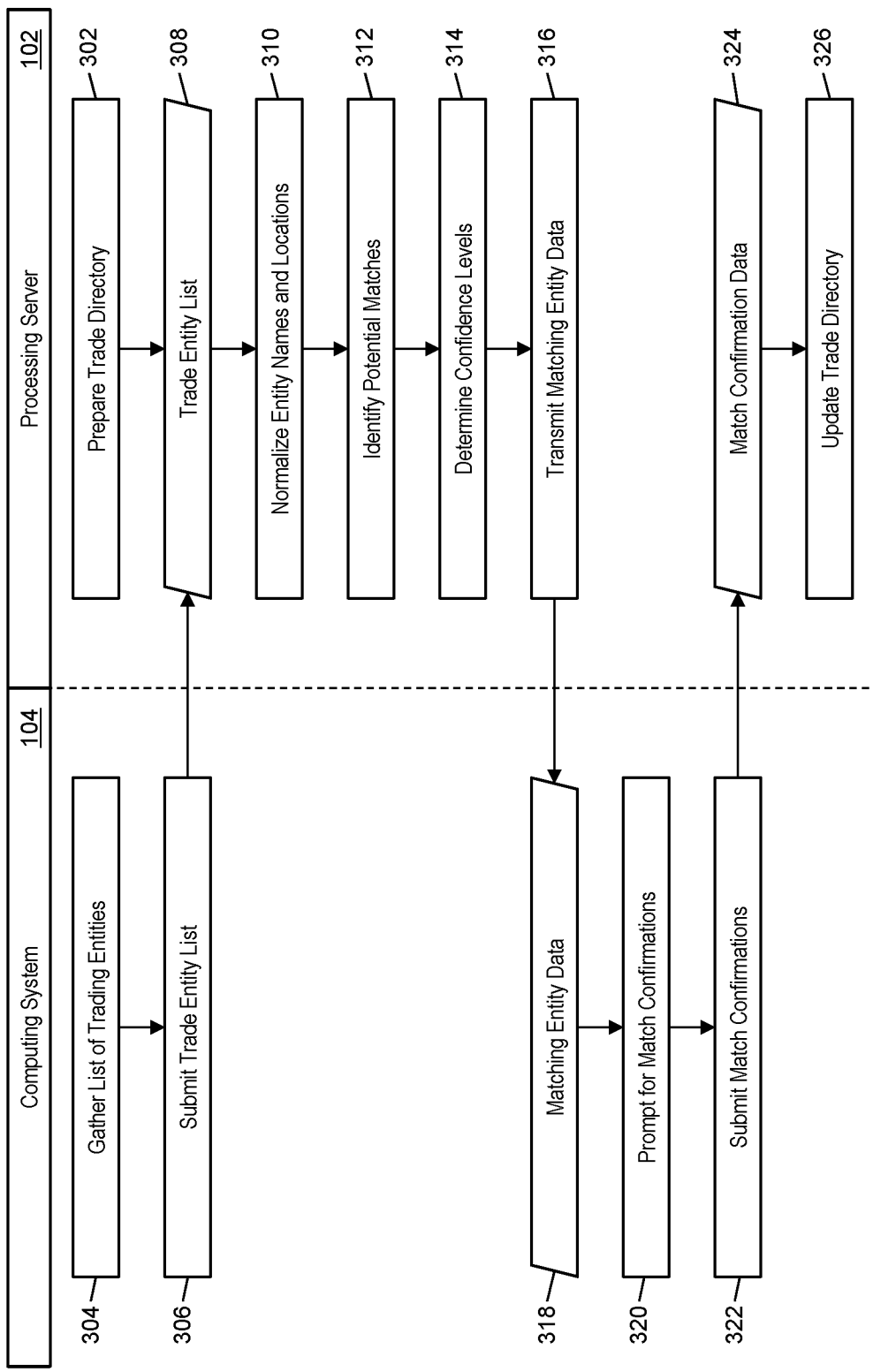
FIG. 3 is a flow chart illustrating a process for matching supplied organizational data in a trade directory in the system of FIG. 1 in accordance with exemplary embodiments.

FIG. 3 illustrates a process for matching supplied organizational data by the processing server 102 in the system 100 supplied by the computing system 104 with formal information for trading entities 106 as stored in the trade directory 206.

In step 302, the processing server 102 may prepare the trade directory 206. Preparation of the trade directory 206 may include the collection of entity information, including names, addresses, banking information, alternative names, industry data, etc., such as from the trading entities 106 themselves and additional data sources 108, etc. The preparation may also include the normalization of names and locations, removal of noise words, which may be common words that can be easily mistaken or largely ignored when providing entity names and/or matching, such as punctuation, organizational indicators (e.g., "LLC," "LLP," "Incorporated," "Co.," etc.). In some cases, preparation may include identification of noise words without removal thereof. In some instances, noise words may be location or industry specific, where noise words may vary, such as organizational indicators differing between countries.

In step 304, the computing system 104 may gather a list of trading entities 106 that they want to submit to the processing server 102 that the computing system 104 is interested in gathering additional information on, or otherwise taking advantage of services offered by the processing server 102, such as for supply chain management, business-to-business transactions, etc. In step 306, the computing system 104 may electronically transmit the list of trading entities 106 to the processing server 102 using a suitable communication network and method. The list may be transmitted via a data file, such as a comma separated value file, and include an organizational entry for each trading entity 106, where each entry includes the entity name and a geographic location for the trading entity 106 known to the computing system 104. For example, the data file may consist of "TPO Tire Co., Alexandria; Patented Auto Parts Inc., Fairfax; Fluids and Such, Arlington." In step 308, the receiving device 202 of the processing server 104 may receive the data file.

In step 310, the generation module 216 of the processing server 102 may normalize the entity names and geographic locations in the organizational entries in the data file received from the computing system 104. In some cases, the normalization may be based on industry and/or location, such as in instances where noise words vary based on industry or location. Normalization may, for instance, include the removal of organizational indicators or adjustment of representation of the geographic location. For instance, in the above example, the list of organizational entries may be normalized to "TPO Tire, Northern Virginia; Patented Auto Parts, Northern Virginia; Fluids and Such, Northern Virginia," due to removal of the indicators and broadening of the geographic locations to be less specific.

In step 312, the determination module 218 of the processing server 102 may determine matches for each of the organizational entries in the received data file. In some embodiments, ten matches may be identified by the determination module 218 for each organizational entry, where matches may be ordered based on strength of the match. Matches may be identified based on a correspondence between the entity name and names in the trade directory 206 as well as the geographic location and the locations in the same entries in the trade directory 206. In some cases, Jaro Winkler and other algorithms may be used where strengths and instances of such may be used in the correspondences, such as to accommodate for misspellings, word transpositions, etc. In some embodiments, if a search based on name and/or location does not yield a strong enough match, an additional search may be performed by the processing server 102. For instance, the determination module 218 may attempt to match the entity name to a name in the trade directory 206 and provide a score of the strength of the match. If the score is below a predetermined level, then an additional search may be performed, such as by performing a web search or a search for a website using the name, and obtaining an alternative entity name therefrom that may be used to determine a match in the trade directory 206. In such instances, the stronger match from the two searches may be used. In some cases, a name match may be performed first, and then a match for geographic locations from the results of the name match, or vice versa. In the above example, the determination module 218 may return matches for the "TPO Tire" entity in Northern Virginia consisting of: "PTO Tire, Northern Virginia; PTO Tire, Washington, D.C.; Top Tire, Northern Virginia; OTP Tires, Southern Virginia; and Tire Tire, Northern Virginia."

In step 314, the determination module 218 may determine confidence levels for each of the organizational entries based on the strength of the matches, such as by assigning levels of "high confidence," "medium confidence," and "low confidence" to each organizational entry. The confidence levels may be based on the strength of the top match, the strength of the matches in order, the strength of all of the identified matches, etc. For instance, in the above example, there may be a "high confidence" in the match for the "TPO Tire, Alexandria" entry due to the match of "PTO Tire, Northern Virginia" having a very high score as determined by the determination module 218. In step 316, the transmitting device 220 of the processing server 102 may electronically transmit the identified match data to the computing system 104 using a suitable communication network for method. The match data may include the matching entries and confidence level for each of the organizational entries.

In step 318, the computing system 104 may receive the match data. In step 320, the computing system 104 may present the match data to a user of the computing system 104. In some cases, presentation of the matches may be based on the confidence level. For instance, if there is a high confidence in the match, then only the top match may be presented to the user for confirmation, while medium confidence matches may present the top four matches to the user for selection of a match, and low confidence matches may result in requesting additional information from the user or presentation of all ten top matches for confirmation. The user of the computing system 104 may be prompted to select matches or confirm matches with high confidence. In step 322, the computing system 104 may transmit confirmations and selections to the processing server 102. For instance, the match data may be presented to the user via a web page hosted by or on behalf of the processing server 102 accessed by the computing system 104, where each selection may be immediately transmitted to the processing server 102 thereby.

In step 324, the receiving device 202 of the processing server 102 may receive the confirmations and selections from the computing system 104. In step 326, the querying module 214 of the processing server 102 may execute a query on the trade directory 206 to update the data entries therein to include additional name and geographic location information based on the matches. For instance, in the above example, if the top match of "PTO Tire" is confirmed, then the misspelling of "TPO Tire" provided in the organizational entry in the data list may be stored as an alternative name or common misspelling, for use in providing stronger matches in the future.

Exemplary Method for Matching Supplied Organizational Data

Figure 4:
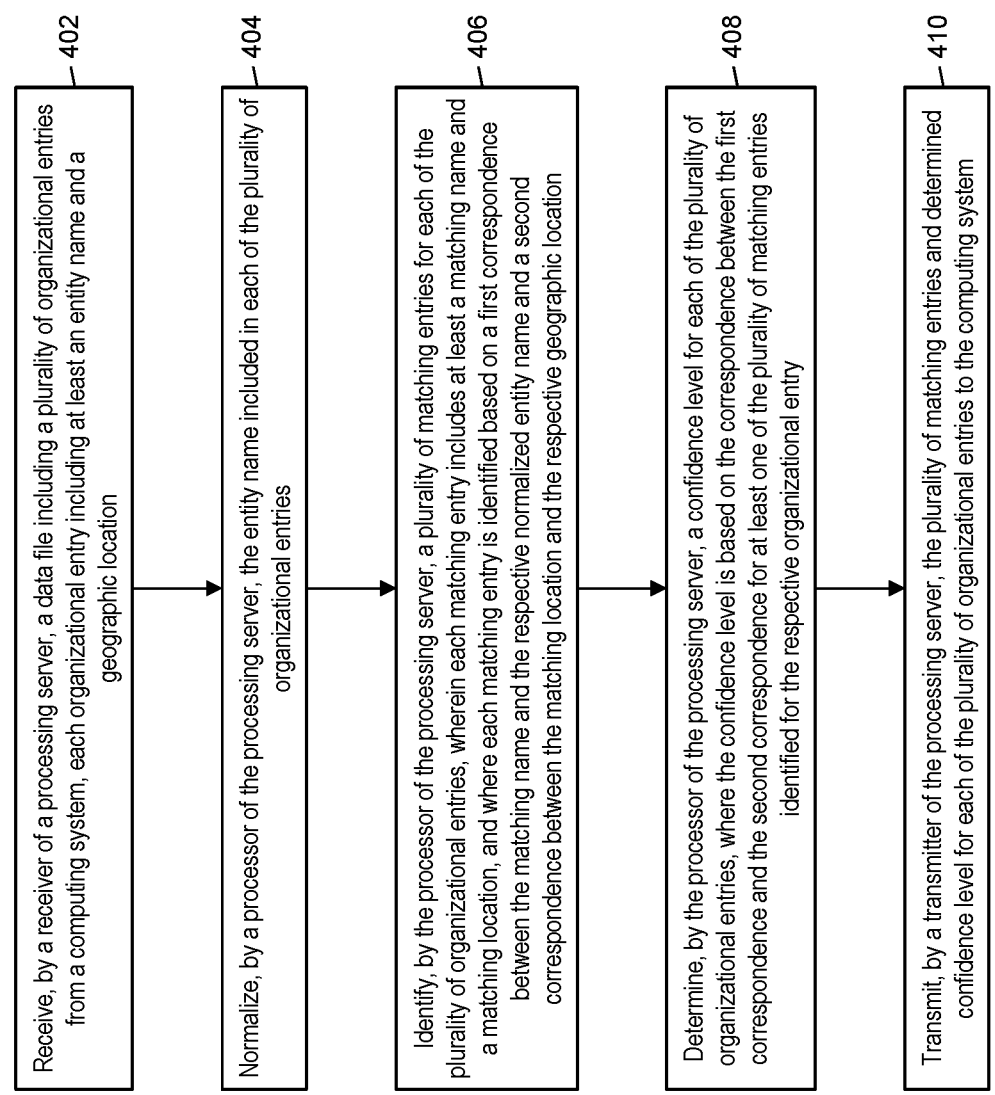
FIG. 4 is a flow chart illustrating an exemplary method for matching supplied organizational data with trade directory information in accordance with exemplary embodiments.

FIG. 4 illustrates a method 400 for matching supplied organizational data with trade directory information using correspondences between normalized names and locations.

In step 402, a data file including a plurality of organizational entries may be received by a receiver (e.g., the receiving device 202) of a processing server (e.g., the processing server 102) from a computing system (e.g., the computing system 104), each organizational entry including at least an entity name and a geographic location. In step 404, the entity name included in each of the plurality of organizational entries may be normalized by a processor (e.g., the generation module 216) of the processing server. In step 406, a plurality of matching entries may be identified by the processor (e.g., the querying module 214 and determination module 218) of the processing server for each of the plurality of organizational entries, wherein each matching entry includes at least a matching name and a matching location, and where each matching entry is identified based on a first correspondence between the matching name and the respective normalized entity name and a second correspondence between the matching location and the respective geographic location.

In step 408, a confidence level may be determined by the processor (e.g., the determination module 218) of the processing server for each of the plurality of organizational entries, where the confidence level is based on the correspondence between the first correspondence and the second correspondence for at least one of the plurality of matching entries identified for the respective organizational entry. In step 410, the plurality of matching entries and determined confidence level for each of the plurality of organizational entries may be transmitted by a transmitter (e.g., transmitting device 220) of the processing server to the computing system.

In one embodiment, the method 400 may further include normalizing, by the processor of the processing server, the geographic location included in each of the plurality of organizational entries, wherein the geographic location used in the second correspondence is the normalized geographic location. In a further embodiment, the normalized geographic location may be represented using latitude and longitude.

In some embodiments, the method 400 may also include receiving, by the receiver of the processing server, a confirmation entity for each of the plurality of organizational entries from the computing system, where the confirmation entity is the matching name included in one of the plurality of matching entries identified for the respective confirmation entry. In a further embodiment, confirmation entities may be received for a subset of the plurality of organizational entries where the determined confidence level is medium confidence.

In one embodiment, the computing system may present one most likely matching entry for a subset of the plurality of organizational entries where the determined confidence level is high confidence to a user of the computing system for confirmation. In some embodiments, the plurality of matching entries and determined confidence level may be transmitted inside of a return data file. In some embodiments, the first correspondence may be determined using a Jaro Winkler distance.

Computer System Architecture

Figure 5:
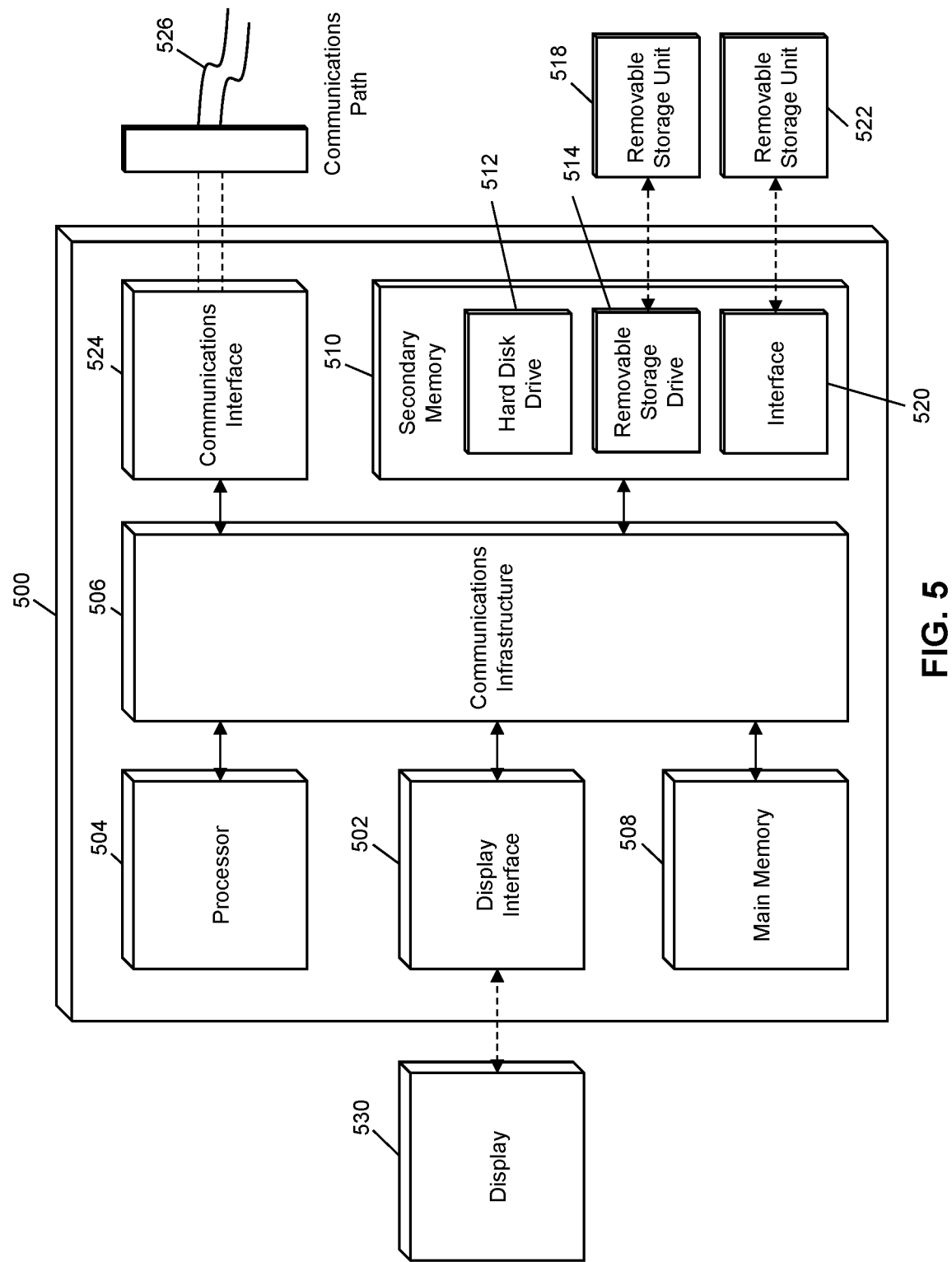
FIG. 5 illustrates a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for matching supplied organizational data with trade directory information. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for matching supplied organizational data with trade directory information, comprising:
   receiving, by a receiver of a processing server, a data file including a plurality of organizational entries from a computing system, each organizational entry including at least an entity name and a geographic location;
   normalizing, by a processor of the processing server, the entity name included in each of the plurality of organizational entries;
   identifying, by the processor of the processing server, a plurality of matching entries in a trade directory for each of the plurality of organizational entries, wherein each matching entry includes at least a matching name and a matching location, and where each matching entry is identified based on a first correspondence between the matching name and the respective normalized entity name and a second correspondence between the matching location and the respective geographic location;
   determining, by the processor of the processing server, a confidence level for at least one of the plurality of matching entries identified for the respective organizational entry, where the confidence level is based on the correspondence between the first correspondence and the second correspondence for the at least one of the plurality of matching entries identified for the respective organizational entry;
   transmitting, by a transmitter of the processing server, the plurality of matching entries identified for each of the plurality of organizational entries and the determined confidence level for each of the plurality of organizational entries to the computing system; and
   receiving, by the receiver of the processing server, a user confirmation for one or more of the plurality of matching entries identified for each of the plurality of organizational entries from the computing system, where the user confirmation is a confirmation indicating that the one or more of the matching entries correctly matches the respective organizational entry of the plurality of organizational entries for which it was identified.

2. The method of claim 1, further comprising:
   normalizing, by the processor of the processing server, the geographic location included in each of the plurality of organizational entries, wherein
   the geographic location used in the second correspondence is the normalized geographic location.

3. The method of claim 2, wherein the normalized geographic location is represented using latitude and longitude.

4. The method of claim 1, wherein the user confirmation is received for a subset of the plurality of organizational entries where the determined confidence level is medium confidence.

5. The method of claim 1, wherein the computing system presents one most likely matching entry for a subset of the plurality of organizational entries where the determined confidence level is high confidence to a user of the computing system for confirmation.

6. The method of claim 1, wherein the plurality of matching entries and determined confidence level are transmitted inside of a return data file.

7. The method of claim 1, wherein the first correspondence is determined using a Jaro Winkler distance.

8. The method of claim 1, wherein a name of one of the plurality of organizational entries of the data file contains a misspelling; and
   in response to receiving a user confirmation for the organizational entry with the misspelling, updating, by the processor of the processing device, the matching entry to include the misspelling as an alternative name or common misspelling of the organizational entry.

9. The method of claim 1, wherein the user confirmation is a user selection of one of the plurality of matching entries identified for one of the plurality of organizational entries.

10. A system for matching supplied organizational data with trade directory information, comprising:
    a computing system; and
    a processing server, the processing server including
       a receiver receiving a data file including a plurality of organizational entries from a computing system, each organizational entry including at least an entity name and a geographic location,
       a processor
          normalizing the entity name included in each of the plurality of organizational entries,
          identifying a plurality of matching entries in a trade directory for each of the plurality of organizational entries, wherein each matching entry includes at least a matching name and a matching location, and where each matching entry is identified based on a first correspondence between the matching name and the respective normalized entity name and a second correspondence between the matching location and the respective geographic location, and determining a confidence level for at least one of the plurality of matching entries identified for the respective organizational entry, where the confidence level is based on the correspondence between the first correspondence and the second correspondence for the at least one of the plurality of matching entries identified for the respective organizational entry, a transmitter transmitting the plurality of matching entries identified for each of the plurality of organizational entries and the determined confidence level for each of the plurality of organizational entries to the computing system; and wherein the receiver of the processing server further receives a user confirmation for one or more of the plurality of matching entries identified for each of the plurality of organizational entries from the computing system, where the user confirmation is a confirmation indicating that the one or more of the matching entries correctly matches the respective organizational entry of the plurality of organizational entries for which it was identified.

11. The system of claim 10, wherein
The processor of the processing server further normalizes the geographic location included in each of the plurality of organizational entries, and the geographic location used in the second correspondence is the normalized geographic location.

12. The system of claim 11, wherein the normalized geographic location is represented using latitude and longitude.

13. The system of claim 10, wherein the user confirmation is received for a subset of the plurality of organizational entries where the determined confidence level is medium confidence.

14. The system of claim 10, wherein the computing system presents one most likely matching entry for a subset of the plurality of organizational entries where the determined confidence level is high confidence to a user of the computing system for confirmation.

15. The system of claim 10, wherein the plurality of matching entries and determined confidence level are transmitted inside of a return data file.

16. The system of claim 10, wherein the first correspondence is determined using a Jaro Winkler distance.

17. The system of claim 10, wherein a name of one of the plurality of organizational entries of the data file contains a misspelling; and in response to receiving a user confirmation for the organizational entry with the misspelling, updating, by the processor, the matching entry to include the misspelling as an alternative name or common misspelling of the organizational entry.

18. The system of claim 10, wherein the user confirmation is a user selection of one of the plurality of matching entries identified for one of the plurality of organizational entries.

* * * * *